Jan. 20, 1959　　　M. KAYE　　　2,869,415
COLOR MEASURING CIRCUIT
Filed Nov. 15, 1954　　　3 Sheets-Sheet 1
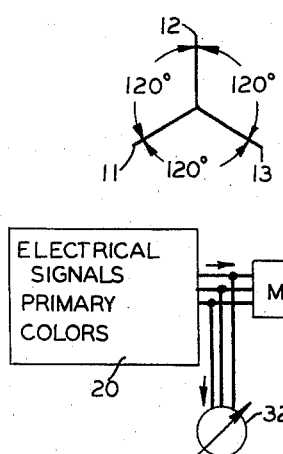
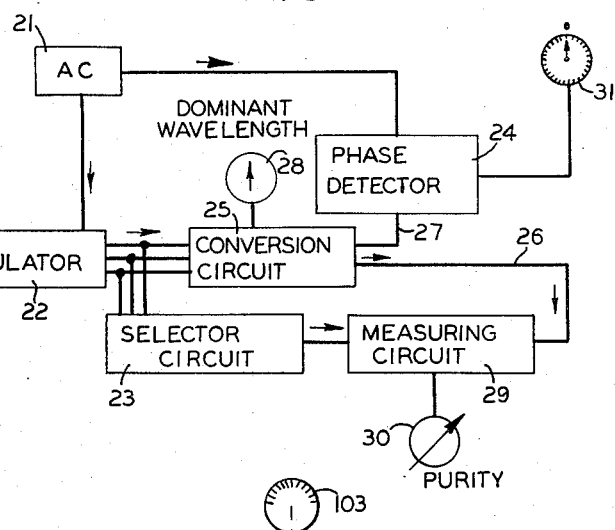
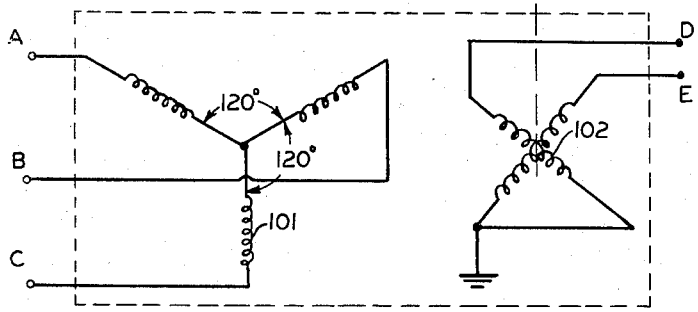
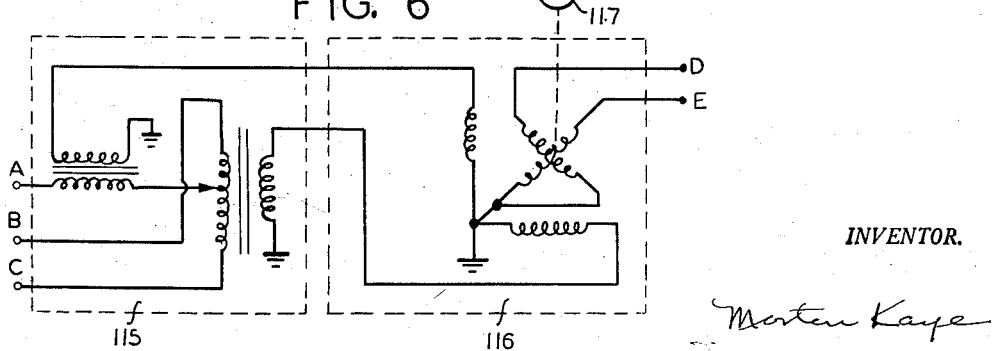
INVENTOR.
Morton Kaye

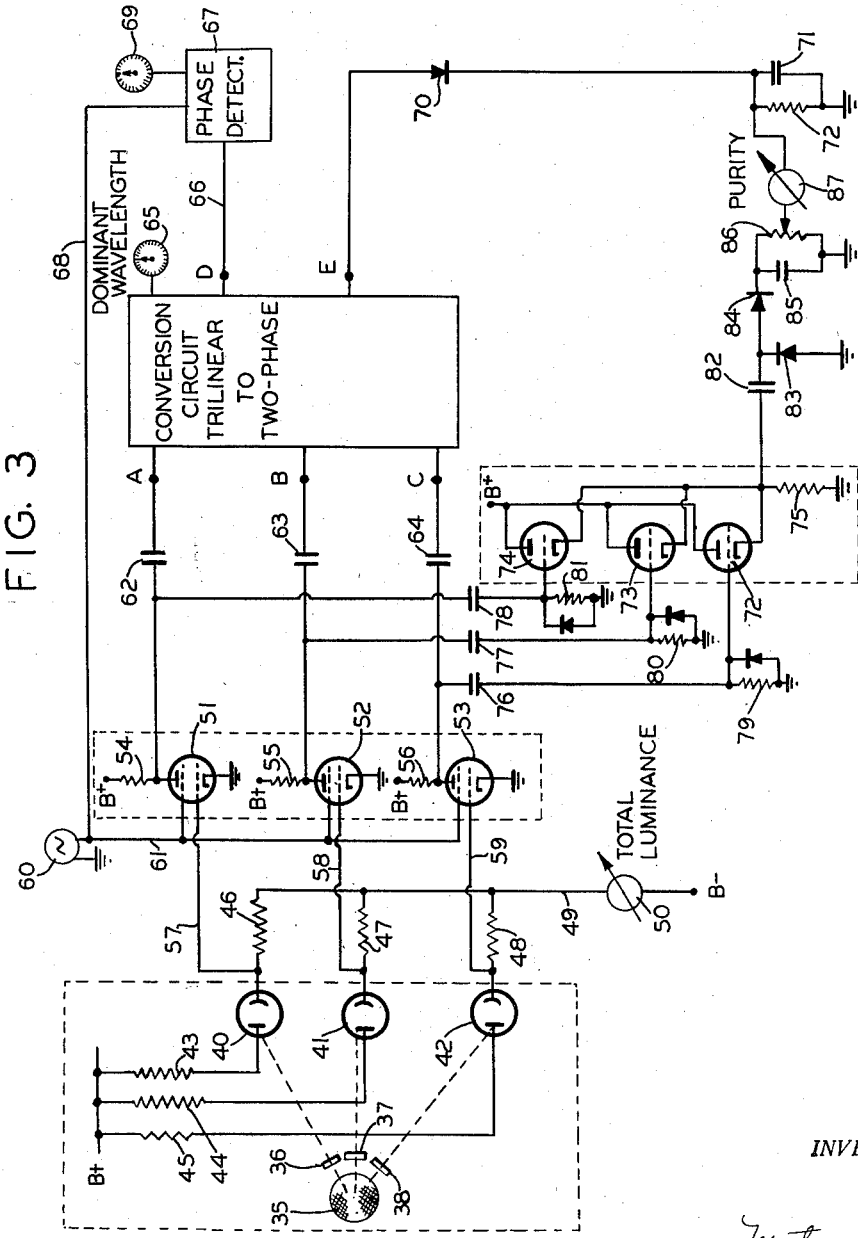

Jan. 20, 1959 M. KAYE 2,869,415
COLOR MEASURING CIRCUIT
Filed Nov. 15, 1954 3 Sheets-Sheet 3

*INVENTOR.*
*Morton Kaye*

United States Patent Office 2,869,415
Patented Jan. 20, 1959

2,869,415

COLOR MEASURING CIRCUIT

Morton Kaye, South Norwalk, Conn., assignor, by mesne assignments, to The Perkin-Elmer Corporation, Norwalk, Conn., a corporation of New York Application November 15, 1954, Serial No. 468,693

3 Claims. (Cl. 88—14)

This invention relates to means for analyzing color and has particular reference to measuring color by electrical means. It is related also to my copending application for Letters Patent Serial No. 467,353 filed November 8, 1954.

Several methods are known to determine color in numerical terms. The spectrographic method for instance, widely used for color determinantion involves the steps of point by point measurement of the spectral content of the sample to be analyzed. In practice, a minimum of thirty points must be measured. Then, after weighting of the test points obtained, a curve can be plotted which is followed by mathematical integration. Finally, the $x$ and $y$ trichromatic (trilinear) coefficients of the I. C. I. (International Commission on Illumination) chromaticity diagram are calculated.

This method, while most accurate, is very time consuming and requires scientific skill and training of the personnel performing this color analysis.

Another method frequently employed is the tristimulus colorimetry. In this method color samples are matched visually by passing light through three color filters. The amount of light through each color filter is carefully recorded and then the $x$ and $y$ coefficients of the chromaticity diagram are calculated in the usual manner. This system similar as the method described above, requires tedious work and scientific training, especially for the mathematical portion of the analysis.

A third well known method, employing photoelectric means and three color filters, measures the color responsive electrical signals generated by the primary color components of the sample under analysis. In the ensuing step, the $x$ and $y$ coefficients are calculated in the very same manner as in the aforementioned other methods.

All of the three methods described and most widely employed provide after extensive calculations results in terms of the chromaticity diagram of the I. C. I. system. Aside from the burdensome calculations which are necessary, several distinct disadvantages become apparent.

Nearly neutral colors have I. C. I. coordinates which are very close for two samples which might be diametrically opposite in hue. Also, the direction and amount of a color difference between two samples is not evident upon inspection of the $x$ and $y$ coefficients. The I. C. I. data, moreover, do not express color in terms which would enable personnel inexperienced in the I. C. I. system to identify color. While the dominant wavelength of the color may be calculated from the I. C. I. coordinates, it represents a source of error and the order of accuracy is comparatively low.

Practice has shown that it is more convenient to express color in terms of dominant wavelength or hue. These latter terms overcome all of the difficulties enumerated above, because nearly neutral colors which have close I. C. I. coordinates may have hues or dominant wavelengths which are widely separated and therefore more readily distinguished. Furthermore the direction and amount of color difference between two color samples is implicit in the statement of their hue or dominant wavelength. Still further, defining a color in terms of hue or dominant wavelength enables the untrained person to visualize the color.

One of the objects of this invention is to provide an improved color measuring circuit which avoids one or more of the disadvantages and limitations of prior art arrangements.

Another object of the invention is to provide a color measuring circuit using electrical means for convenient, rapid and instantaneous color determination.

Another objective of the invention is providing a color measuring circuit which determines color without the use of mathematical calculations.

Still another object of the invention is the provision of a color measuring circuit which readily can be operated by production as well as laboratory personnel.

A further object of the invention is the provision of a color measuring device which provides a numerical value of color in terms of dominant wavelength or hue.

Another object of the invention is to provide a rapid color measuring circuit which reveals color analysis in terms of dominant wavelength or hue, in terms of purity or saturation and in terms of total luminance, total luminosity, total reflectance or total transmittance.

A still further object of the invention is the provision of a color measuring device which by virtue of its instantaneous determination of three basic color parameters is adapted for continuous production processes.

As used throughout the specification and claims the term "primary colors" shall define such colors which if added in equal amounts produce a neutral color.

As used throughout the specification and claims a "trilinear coordinate system" or "trilinear input" shall define a system of three signals, each signal corresponding to a trichromatic color value and the amplitude of each signal being proportional to the magnitude of said trichromatic value.

One feature of the invention includes a color measuring circuit which comprises photoelectric means for producing a plurality of electrical signals responsive to the primary colors of the color to be measured. A source of alternating current voltage is also provided. Modulating means are connected to the color responsive electrical signals and to the alternating current source to produce a plurality of primary color responsive modulated signals. Circuit means are included which are adapted to convert the modulated signals from a trilinear coordinate system to a two-phase system.

For a better understanding of the present invention, together with other and further objects thereof, reference is made to the following description taken in connection with the accompanying drawings in which:

Figure 1 is a vector diagram used for explaining certain features of the underlying theory;

Figure 2 is a schematic block diagram of one embodiment of the invention;

Figure 3 is a schematic circuit diagram of the embodiment shown in Figure 2;

Figure 4 is a schematic diagram of a typical conversion circuit shown in block form in Figures 2 and 3;

Figure 5A:
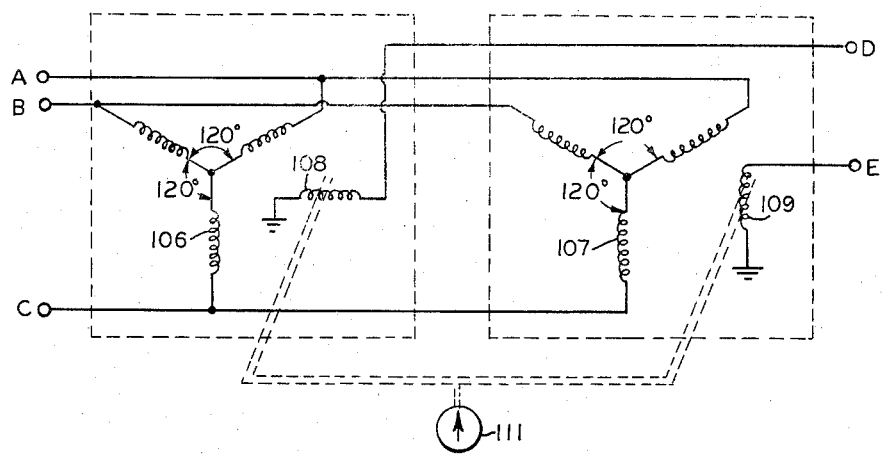
Figure 5B:
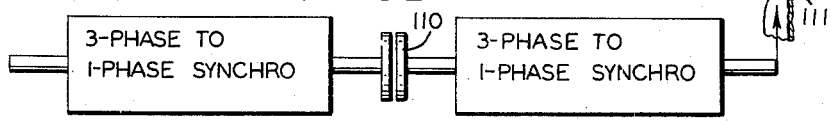
Figure 7B:
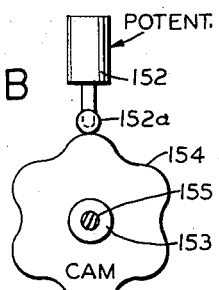
Figure 7A:
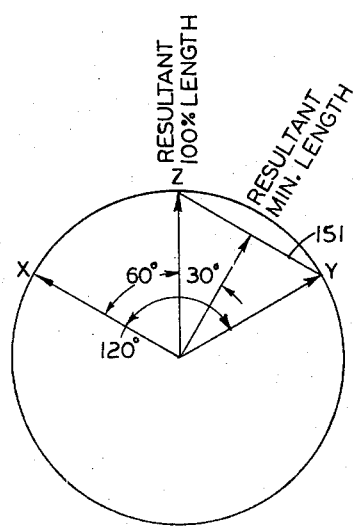
Figure 7C:
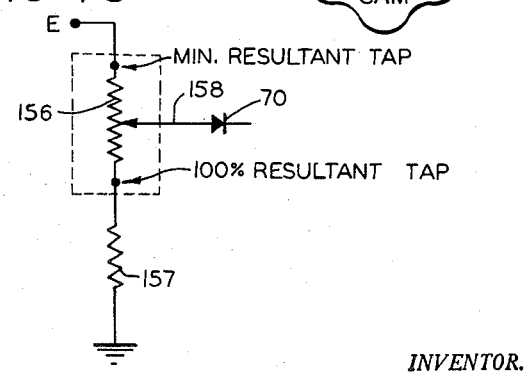

Figure 5A schematically depicts an alternate conversion circuit;

Figure 5B is the mechanical illustration of Figure 5A;

Figure 6 is a still further alternate for the conversion circuit;

Figure 7A is a vector diagram to illustrate certain conditions;

Figure 7B illustrates the mechanical arrangement of a voltage compensating circuit, and Figure 7C is the schematic circuit diagram explained in connection with Figures 7A and 7B.

Referring now to Figure 1, three vectors of equal length 11, 12 and 13 are shown, each shifted 120 degrees from the other. It is well known that in this condition their vector sum is zero. Now, when one of the vectors is omitted and the remaining vectors are of differing magnitude, the vector sum or resultant vector is approximately equal to the larger vector and the angle thereof depends upon the relative length of the two vectors. The only factor affecting the length of the resultant vector is the addition of the original third vector quantity. The longer the third vector, the shorter the resultant of the two remaining vectors. A similar condition prevails in color measurement, namely the more of a third primary color is present, the less pure the color.

If the vectors are used to represent three primary colors, the following corollaries may be drawn:

a. The hue or dominant wavelength of a color may be represented by the angle of the resultant vector;

b. The purity or saturation of the color may be represented by the ratio between the length of the resultant vector and the longest primary vector; and c. Total luminosity, total luminance, total reflectance or total transmittance may be represented by the arithmetic sum of the primary vectors.

Figure 2 is a block diagram of a circuit which may be used to accomplish the color analysis based on the vector principle explained above. Numeral 20 identifies a photoelectric means for generating three electrical signals responsive to the three primary color components of the color sample under analysis. Each of these three color responsive electrical signals as well as an alternating current voltage source 21 are connected to a modulator 22. The modulator 22 produces three modulated output signals, each signal being an alternating current signal modulated with one of the primary color responsive electrical signals. A selector circuit 23 connected to the output side of the modulator selects that modulated signal which is characterized by the largest amplitude. A conversion circuit 25 which is adapted to convert three input signals from a trilinear coordinate system to two output signals is connected to the output side of the modulator. This conversion circuit is equipped with means 28 to adjust or tune it in such a manner that the output signal in conductor 27 can be tuned for minimum amplitude or substantially zero at which instant the signal in conductor 26 is at a maximum. The signal in conductor 27 is connected to a detector circuit 24 which is also connected to the alternating current voltage source 21. Meter 31 is a zero-center indicating instrument. By operating adjusting means 28 until meter 31 reads zero, a convenient method is obtained to "tune" for maximum and minimum signal respectively because at that adjustment the signal in conductor 27 is at a minimum. When such balance is shown on meter 31, a dial cooperating with adjusting means 28 may be calibrated to indicate dominant wavelength or hue.

The maximum amplitude signal in conductor 26 is applied to a measuring circuit 29 where the amplitude of this resultant signal is compared with the amplitude of the largest modulated signal supplied from selector circuit 23. The ratio of these voltages is a measure of purity, or saturation of the color under analysis, its value being rendered visible on instrument 30. The arithmetic sum of the three primary color responsive signals, being a measure of total luminance, total luminosity, total reflectance or total transmittance, is read on an indicating means 32. As explained previously, the three color parameters thus obtained suffice for clear and concise color analysis.

The above explained block diagram may be compared with Figure 3 in which photoelectric tubes 40, 41 and 42 receive light from the color sample 35 via a set of three primary color light filters 36, 37 and 38. Each photoelectric tube receives one of the primary colors and thus generates an electrical signal which is responsive to the intensity of the respective primary color. Each of the photoelectric tubes is connected to an anode power supply via anode resistors 43, 44 and 45 respectively. The current through each of the cathode resistors 46, 47 and 48 is proportional to the amount of light which strikes the associated photoelectric tube. Conductor 49 provides a common junction for these resistors and thus the three individual photo responsive signals are added to yield their arithmetic sum which is rendered visible on an indicating means 50, such as an ammeter. This indicating meter may be calibrated to read total luminance, total luminosity, total reflectance or total transmittance, depending upon the color sample under analysis.

Three multi-grid electronic tubes 51, 52 and 53 together with their respective anode resistors 54, 55 and 56 are used as modulating means, each tube for one of the primary colors. The lower grids of the modulator tubes are connected to the cathode of an associated photoelectric tube via conductors 57, 58 and 59 respectively, while the upper grids are connected to a source of alternating current voltage 60 via conductor 61. In this manner the modulating means are made to produce three alternating current output signals, the amplitude of each signal being dependent upon the amplitude of the direct current of the associated photoelectric tube.

The output from the modulator comprising the three modulated signals are connected via blocking capacitors 62, 63 and 64 to the input terminals A, B and C of a conversion means which is adapted to convert the three input signals from a trilinear coordinate system to two output signals so that one output signal is at a maximum when the other output signal is at a minimum. This conversion circuit will be explained in greater detail in connection with Figures 4, 5 and 6. The output from the conversion circuit is apparent on terminals D and E. For proper operation of the circuit it is necessary that the conversion means can be adjusted or tuned in such a manner that one output signal is at a maximum (terminal E) at which setting the other signal (terminal D) is at a minimum or substantially zero. In order to determine this adjustment a detector circuit 67 is employed. This detector circuit is connected to terminal D via conductor 66 and to the source of A.-C. voltage via conductor 68. When adjusting the conversion circuit so that zero-center meter 69 cooperating with detector circuit 67 indicates zero, at which time terminal D is at a minimum, a dial 65 cooperating with the adjusting means of the conversion circuit can be calibrated to indicate the vectorial disposition of the resultant magnetic field and its correlation to dominant wavelength or hue. The maximum signal at terminal E is connected via a rectifier 70 to one side of a conventional voltage comparing bridge circuit comprising a filter capacitor 71 and resistor 72.

A selector circuit adapted to select that modulated output signal which is characterized by the largest amplitude comprises electron tubes 72, 73 and 74 which are connected in parallel at their anodes and cathodes. Resistor 75 is the common cathode resistor. The grid of each tube is connected via a blocking capacitor 76, 77 and 78 respectively to one of the anodes of the modulator tubes on which the modulator signal is apparent. Resistors 79, 80 and 81 serve as bleeders. By virtue of the common cathode resistor 75 only the signal with largest amplitude is passed to capacitor 82 which together with rectifiers 83 and 84 comprises a rectifying and voltage doubling circuit. Capacitor 85 serves as a filter capacitor for the signal. It will be apparent that the amplitude of the selected A.-C. signal (modulated signal with largest amplitude) may thus be compared with the amplitude of the output signal from the conversion circuit in terms of D.-C. voltage. Adjustable resistor 86, resistor 72 and voltmeter 87 form this comparing circuit. When adjusting the slider on potentiometer 86 until the meter 87 reads zero, a dial (not shown) cooperating with the slider can be calibrated to read the ratio of voltages appearing on resistor 72 with respect to the voltage on potentiometer 86. For the instant application the dial may be calibrated in percent purity or saturation which, as has been explained, is related to the amplitude ratio of resultant vector to largest color responsive signal.

It will be obvious to those skilled in the art that instead of the detector circuit 67 a null detector circuit may be employed keeping in mind however that two "nulls" may occur, i. e. when in-phase and when 180 degrees out-of-phase. Such detector circuits are well known in the electrical art, special reference being made to: Radio Engineering (book) by F. E. Terman, McGraw Hill Book Co., New York, N. Y., third edition 1947, pages 522–525.

In order to compensate for non-uniformities among the plurality of photoelectric tubes, light transmitting characteristics of the optical filters, modulating tubes, etc., it will be advantageous to adjust the amplitudes of the alternating current voltages applied to the grids of the modulator tubes 51, 52 and 53 in such a manner that the three modulated signals are of equal amplitude when testing a neutral color sample. Such a measurement will serve as a convenient calibrating means.

Figures 4, 5 and 6 show typical examples of conversion circuits which are adapted to convert three inputs of a trilinear coordinate system to a vectorial resultant.

Figure 4 shows the schematic circuit diagram of a conventional synchro. The input to the three winding stator 101 is applied at inputs A, B and C and the output is apparent on terminals D and E of the rotor winding 102. The input windings are displaced 120 degrees with respect to one another whereas the output windings are displaced 90 degrees. As it is well known in the art, the rotor winding may be rotated mechanically until one winding obtains the maximum signal, the vectorial resultant of the inputs, at which setting the other rotor winding shows a minimum signal. The angular adjustment may be read on dial 103 which is coupled mechanically to the rotor shaft. It is to be understood clearly that in a similar manner, the rotor and stator windings may be reversed, that is a three-winding rotor and a two-winding stator.

Figures 5A and 5B show the use of a pair of three-winding to single winding synchros connected together. The three stator windings of a first synchro 106 and of a second synchro 107 are connected in parallel and applied to the input terminals A, B and C. The two single rotor windings 108 and 109 of these synchros are disposed at 90 degrees with respect to one another. This is indicated in Figure 5B, wherein the rotor shafts are mechanically coupled by virtue of coupling 110. Both rotors thus are turned in unison. Winding 108 is applied between ground and terminal D, winding 109 between ground and terminal E, which connection corresponds to the one depicted in Figure 4. Indicating means 111 serve to indicate the angular adjustment of the rotors when the signal at terminal E is at a maximum and terminal D is at a minimum.

Figure 6 shows still another alternate of a conversion circuit using the combination of a so-called "Scott transformer" 115 in series with a two-winding to two-winding synchro 116. The Scott transformer is used to convert from a trilinear input system to a conventional coordinate system and the synchro is used to obtain a maximum (resultant) and minimum output signal respectively. Indicating means 117 again shows the mechanical rotation (or angular displacement) of the synchro rotor. In all these cases the indicating means can be calibrated to read dominant wavelength or hue, because the mechanical displacement is directly related to the vectorial angle of the resultant signal. The construction, characteristics and behavior of synchros sometimes known under the trade names "Selsyn," "Autosyn," etc., are well described in the book entitled "Components Handbook" by John F. Blackburn, MIT Radiation Laboratory Series, vol. 17, McGraw Hill Book Co., Inc., New York, N. Y., 1949, particularly chapter 10.

In order to maintain high accuracy it is necessary that the input to synchros is coupled to a relatively low impedance source. To insure such a condition electron tubes 51, 52 and 53 of Figure 3 should be tubes with comparatively low plate resistance, such as tubes commonly referred to as "power tubes." A stage of cathode followers may be employed to effect impedance transfer from high to low input impedance for the following synchro stage.

Modulation may be accomplished also by cathode followers or other circuits as are well known in the art. If necessary, an amplifying stage may be interposed between the modulation tubes and the synchros without departing from the principle of the invention.

When analyzing a pure color, either one or two vectors exist, such as vector X and vector Y in Figure 7A. If there are two vectors of equal magnitude, the resultant vector Z is disposed half way between vectors X and Y and it is also of the same magnitude as the individual color vectors. Assuming that vector X becomes shorter which occurs when there is a shift in hue of the color (purity remaining constant), then the new resultant vector shifts from the position of resultant Z toward resultant Y as vector X approaches zero amplitude. The amplitude of this new resultant is defined by the chord 151, being a minimum at 30 degrees from Y. Since the purity is equal to the resultant vector divided by the largest selected vector, it is desirable that the amplitude of the resultant vector be kept constant regardless of the shift in hue. This can be accomplished readily by employing a voltage compensating circuit such as illustrated in Figures 7B and 7C. A cam 154 having six identical curves about its periphery, each curve having one low and one high spot to compensate for filter imperfections, is mounted on synchro rotor shaft 155 of the synchro 153 described in connection with Figures 4, 5 and 6. The sliding contact of a linear displacement potentiometer 152 is operated responsive to the position of the cam via a cam follower 152a. As the synchro shaft 155 is rotated through a single turn, the potentiometer slider contact is displaced six times from maximum to minimum. The electrical connections of this compensating circuit is depicted in Figure 7C. The potentiometer winding 156 is inserted between terminal E (Figure 3) and ground in series with fixed resistor 157. When rotating the synchro rotor shaft to find maximum and minimum voltage respectively, slider 158 moves from one end of the winding to the other end. Slider 158 is connected to rectifier 70 (Figure 3). As slider 158 moves to the "Minimum Resultant" tap it obtains a larger voltage than at the "100% Resultant" tap, the latter being connected to terminal E through resistance winding 156. By suitably shaping the cam and by suitably selecting the resistance winding 156 so that its voltage drop corresponds to the difference between the 100% resultant length and the resultant minimum length, the amplitude of the resultant vector can be kept constant. It will be apparent that such a voltage compensating may be inserted after the selector circuit instead of the conductor from terminal E. In both cases it is necessary however, that the potentiometer is operated responsive to the adjustment of the synchro in a 6 to 1 ratio. These are but a few of the modifications and substitutions which readily can be made without departing from the broad principle of the color measuring circuit disclosed.

For the definition of the color terms used and colorimetry in general, reference is made to the book "Color in Business, Science and Industry" by Deane B. Judd, John Wiley & Sons, Inc., New York, N. Y. 1952.

While there have been described and illustrated specific embodiments of the invention, it will be obvious that various changes and modifications may be made therein without departing from the field of the inven-

What is claimed is:

1. An electrical color measuring circuit comprising means for producing an electrical signal proportional to each of the primary colors contained in the color to be measured, a source of alternating current voltage, a plurality of modulating means energized by said voltage source and each connected to receive a primary color signal for producing an A. C. signal proportional to a primary color, electromagnetic means having a stator connected to receive said modulated signals at equidistant points about its circumference, said means including an adjustable rotor in magnetic flux linkage with the resultant magnetic field of said stator, whereby the position of said rotor which produces maximum signal is indicative of the hue of said color to be measured.

2. An electrical color measuring circuit comprising means for producing an electrical signal proportional to each of the primary colors contained in the color to be measured, a source of alternating current voltage, a plurality of modulating means energized by said voltage source and each connected to receive a primary color signal for producing an A. C. signal proportional to a primary color, a selector circuit for selecting the largest of said modulated signals, electromagnetic means having a stator connected to receive said modulated signals at equidistant points about its circumference, said means including an adjustable rotor in magnetic flux linkage with the resultant magnetic field of said stator, and means for comparing said selected largest modulated signal with the output of said rotor, whereby the position of said rotor which produces maximum signal is indicative of the hue of said color to be measured, and the output of said comparison means is an indication of the purity of the color to be measured.

3. An electrical color measuring circuit comprising means for producing an electrical signal proportional to each of the primary colors contained in the color to be measured, a source of alternating current voltage, a plurality of modulating means energized by said voltage source and each connected to receive a primary color signal for producing an A. C. signal proportional to a primary color, means for adding said modulated signals to indicate the total luminosity of said color being measured, a selector circuit for selecting the largest of said modulated signals, electromagnetic means having a stator connected to receive said modulated signals at equidistant points about its circumference, said means including an adustable rotor in magnetic flux linkage with the resultant magnetic field of said stator, and means for comparing said selected largest modulated signal with the output of said rotor, whereby the position of said rotor which produces maximum signal is indicative of the hue of said color to be measured, and the output of said comparison means is an indication of the purity of the color to be measured.

References Cited in the file of this patent

UNITED STATES PATENTS

| | | |
|---|---|---|
| 2,490,812 | Huffman | Dec. 13, 1949 |
| 2,685,063 | Alsberg | July 27, 1954 |
| 2,716,151 | Smith | Aug. 23, 1955 |
| 2,774,276 | Glasser et al. | Dec. 18, 1956 |

FOREIGN PATENTS

| | | |
|---|---|---|
| 687,405 | Germany | Jan. 29, 1940 |